(12) United States Patent
Hsu (10) Patent No.: US 10,813,379 B2
(45) Date of Patent: Oct. 27, 2020

(54) TUBE EXCHANGING DEVICE OF THREE DIMENSIONAL PRINTER

(71) Applicant: HON HAI PRECISION INDUSTRY CO., LTD., New Taipei (TW)

(72) Inventor: Shao-Hung Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 713 days.

(21) Appl. No.: 15/609,152

(22) Filed: May 31, 2017

(65) Prior Publication Data

US 2018/0311908 A1 Nov. 1, 2018

(30) Foreign Application Priority Data

Apr. 28, 2017 (CN) .......................... 2017 1 0290563

(51) Int. Cl.
| | |
|---|---|
| *B33Y 40/00* | (2020.01) |
| *B29C 67/00* | (2017.01) |
| *A23P 20/20* | (2016.01) |
| *B29C 64/20* | (2017.01) |
| *A23P 20/25* | (2016.01) |

(52) U.S. Cl.
CPC .............. *A23P 20/20* (2016.08); *B29C 64/20* (2017.08); *B33Y 40/00* (2014.12); *A23P 2020/253* (2016.08)

(58) Field of Classification Search
CPC .......... B29C 64/20; A23P 30/20; A23P 20/20; A23P 2020/253; B33Y 40/00
See application file for complete search history.

(56) References Cited

U.S. PATENT DOCUMENTS

| | | | |
|---|---|---|---|
| 4,496,958 A | 1/1985 | Brandt et al. | |
| 2014/0363532 A1* | 12/2014 | Wolfgram | B33Y 30/00 425/113 |
| 2016/0271873 A1* | 9/2016 | Albert | B29C 64/255 |
| 2018/0168217 A1* | 6/2018 | Berkhout | A23P 20/20 |
| 2018/0194126 A1* | 7/2018 | Hagedorn | B22F 3/1055 |
| 2018/0297283 A1* | 10/2018 | Hagedorn | B33Y 40/00 |
| 2018/0338519 A1* | 11/2018 | Albert | A23P 20/25 |
| 2019/0099834 A1* | 4/2019 | Bunz | B23K 26/1482 |
| 2019/0105836 A1* | 4/2019 | Lan | B29C 64/393 |

* cited by examiner

*Primary Examiner* — Nahida Sultana
(74) *Attorney, Agent, or Firm* — ScienBiziP, P.C.

(57) ABSTRACT

A tube exchanging device of a three dimensional (3D) printer for allowing containers of multiple materials (tubes) to be used in printing includes a plurality of tubes and a holder. The holder comprises a first side wall and a first bottom wall, and a plurality of first clamping parts is installed on the first side wall. Each first clamping part fixes a tube on the holder, each first clamping part comprises two hooking parts, which are set in two front ends of the first clamping part. Each tube comprises a guiding surface and two locking surfaces. When the two hooking parts slide from the guiding surface to the two locking surfaces, the two hooking parts are limited by the two locking surfaces to fix the tube on the holder.

17 Claims, 10 Drawing Sheets

TUBE EXCHANGING DEVICE OF THREE DIMENSIONAL PRINTER

FIELD

The subject matter herein generally relates to a three dimensional (3D) printer.

BACKGROUND

A 3D printer comprises a plurality of tubes carrying material for creating objects. The plurality of tubes is fixed on a holder of the 3D printer by a plurality of leaf springs. When a tube is filled with material, the tube may weigh several hectograms. The tube may therefore drop down from the holder.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 1:
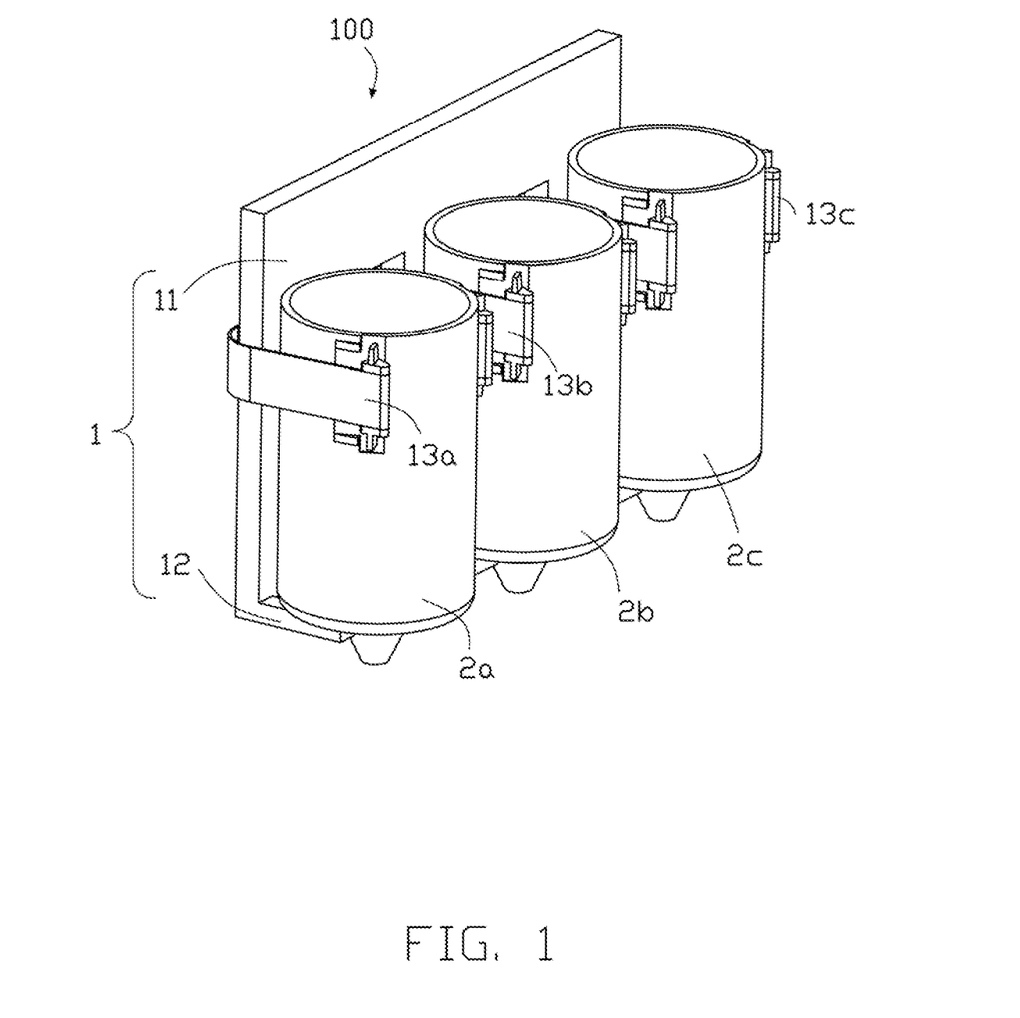
FIG. 1 is a diagram of an exemplary embodiment of a tube exchanging device.

FIG. 1 illustrates a tube exchanging device 100 in accordance with an exemplary embodiment.

The tube exchanging device 100 can be used in a 3D printer (not shown). The tube exchanging device 100 comprises a holder 1 and a plurality of tubes carrying material for the creation of a 3D object. The tubes can carry food material for example. The holder 1 comprises a first side wall 11 and a first bottom wall 12, a plurality of clamping parts is installed on the first side wall 11. One clamping part corresponds to fix one tube on the holder 1. In this exemplary embodiment, three tubes, 2a, 2b, and 2c, are provided as an example, and three corresponding clamping parts, 13a, 13b, and 13c, are provided as an example.

In one exemplary embodiment, each tube 2a through 2c, is configured to dispense a material and each tube 2a through 2c, can provide the same or different material.

The first bottom wall 12 is configured to support the tubes 2a to 2c. The clamping part 13a can clamp the tube 2a, the clamping part 13b can clamp the tube 2b, and the clamping part 13c can clamp the tube 2c. The tubes 2a through 2c, can thus be fixed on the holder 1.

In one exemplary embodiment, each of the tubes 2a through 2c, has the same structure and each of the clamping parts 13a through 13c, has the same structure. In this exemplary embodiment, the tube 2a and the clamping part 13a are described as examples.

Figure 2:
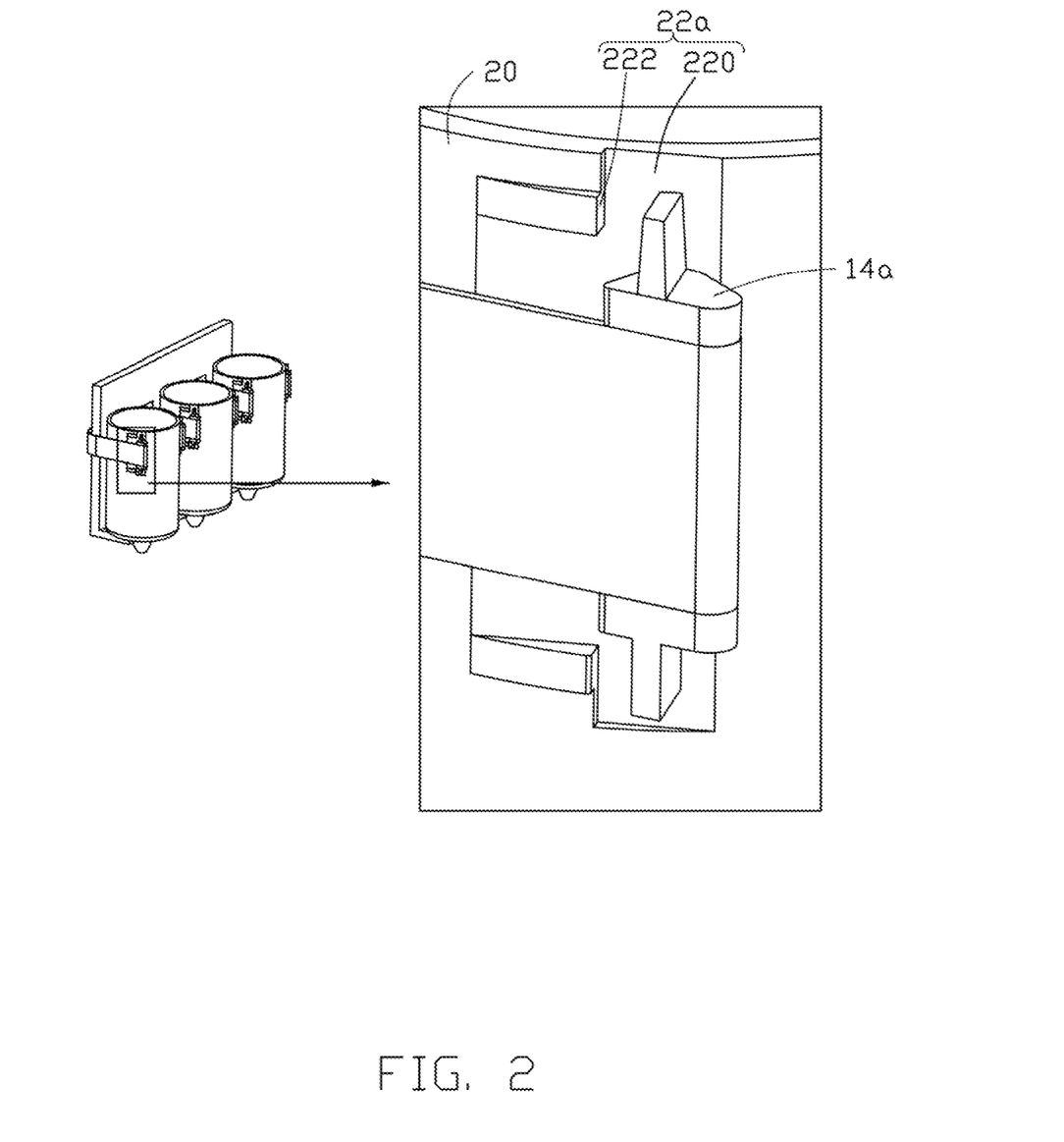
FIG. 2 is a partial enlarged diagram of an exemplary embodiment of the tube exchanging device of FIG. 1.
Figure 3:
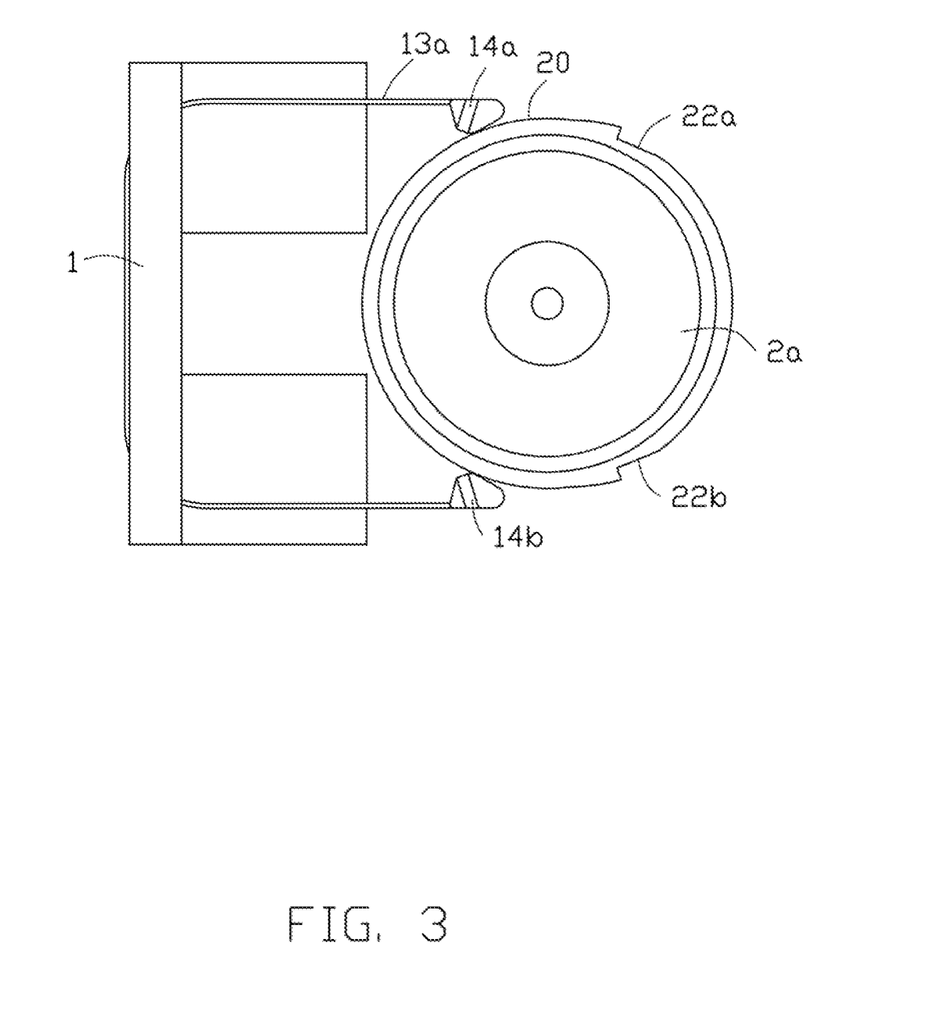
FIG. 3 is a diagram illustrating a tube and a holder.
Figure 4:
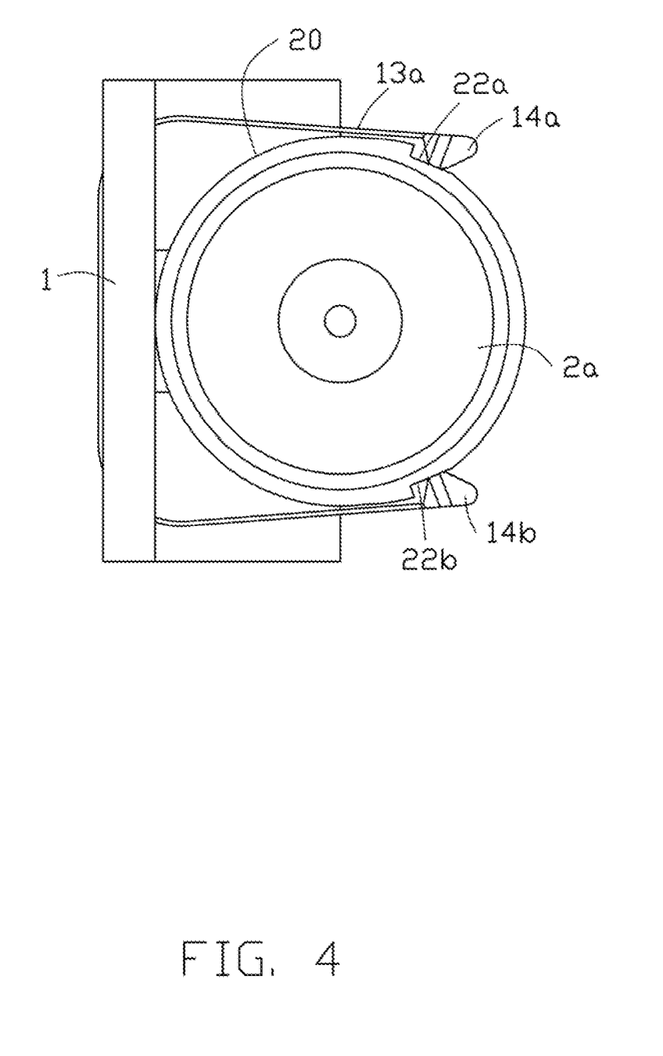
FIG. 4 is a diagram illustrating the tube in the holder of FIG. 3.

Referring to FIGS. 2-4, the clamping part 13a comprises two hooking parts 14a and 14b, which are set in two front ends of the clamping part 13a. The tube 2a comprises a guiding surface 20 and two locking surfaces 22a and 22b. When the tube 2a is held in place in the holder 1 through the clamping part 13a, the hooking part 14a slides from the guiding surface 20 to the locking surface 22a and the hooking part 14b slides from the guiding surface 20 to the locking surface 22b. Then, the hooking parts 14a and 14b are limited by the locking surfaces 22a and 22b, and the tube 2a is fixed on the holder 1 by the clamping part 13a.

In one exemplary embodiment, the locking surfaces 22a and 22b both comprise a clamping surface 220 and a limiting surface 222. The limiting surface 222 is located between the guiding surface 20 and the clamping surface 220. The hooking part 14a slides from the guiding surface 20 to the clamping surface 220 to be limited by the limiting surface 222.

Figure 5:
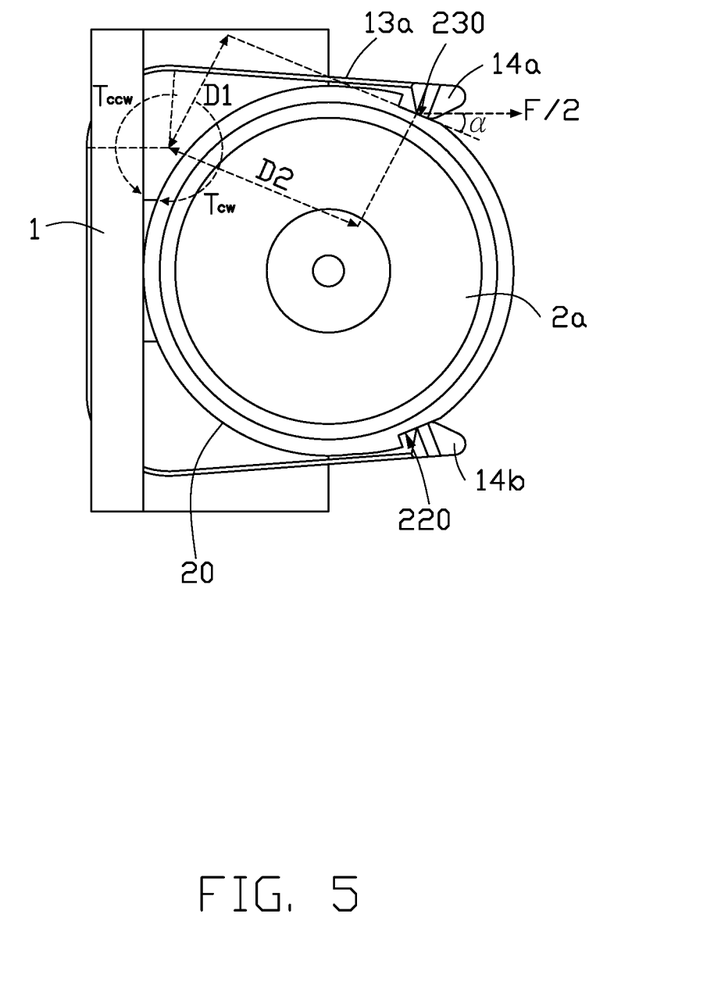
FIG. 5 is a diagram illustrating the tube locked by a first clamping part of the device of FIG. 1.

Referring to FIG. 5, when the hooking parts 14a contact the clamping surface 220, the hooking parts 14a and the clamping surface 220 have a contacting surface 230. A friction coefficient μ exists between the hooking parts 14a and the clamping surface 220 ($\mu<1$). When an external force F tries to pull out the tube 2a from the holder 1, a first force moment $T_{cw}$ and a second force moment $T_{ccw}$ are generated. The first force moment $T_{cw}$ makes the hooking parts 14a fit more closely to the clamping surface 220. The second force moment $T_{ccw}$ attempts to pull the hooking parts 14a away from the clamping surface 220. The first force moment $T_{cw}$ have a first force arm D1 and the second force moment $T_{ccw}$ have a second force arm D2.

In one exemplary embodiment, the second force arm D2 is greater than the first force arm D1.

An angle α exists between the clamping surface 220 and the external force F. According to a formula of the force moment, the first force moment $T_{cw}=F/2* \sin\alpha * D2$, and the second force moment $T_{ccw}=F/2*\sin\alpha*\mu*D1$. To achieve locking of the tube 2a by the clamping part 13a, the first force moment $T_{cw}$ needs to be greater than the second force moment $T_{ccw}$ (i.e., $F/2*\sin\alpha*D2 > F/2*\sin\alpha*\mu*D1$). Then, the equation $\mu<D2/D1$ must be true. Because the second force arm D2 is greater than the first force arm D1 (D2/D1 >1,μ<1), the equation μ<D2/D1 is true. Then, the first force moment $T_{cw}$ is greater than the second force moment $T_{ccw}$, and the tube 2a can be locked by the first clamping part 13a.

Figure 6:
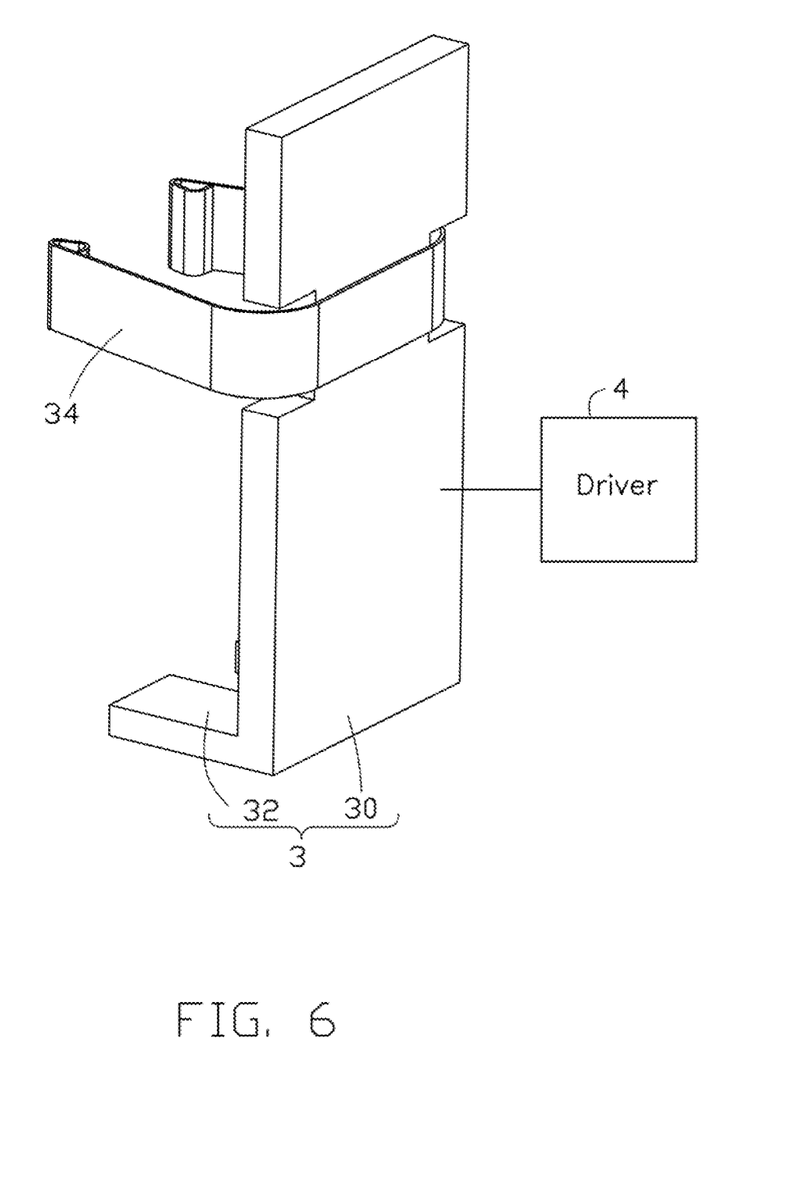
FIG. 6 is a diagram of an exemplary embodiment of a printing base.

Referring to FIG. 6, the tube exchanging device 100 further comprises a printing base 3 and a driver 4. The printing base 3 comprises a second side wall 30 and a second bottom wall 32. A sub clamping part 34 is installed on the second side wall 30. The driver 4 can drive the printing base 3 to grasp the tube 2a from the holder 1 through the sub clamping part 34.

In one exemplary embodiment, the clamping part 13a and the sub clamping part 34 are leaf springs. Then, the clamping part 13a and the sub clamping part 34 can make contact with the tube 2a and provide a clamping force on the tube 2a.

Figure 7:
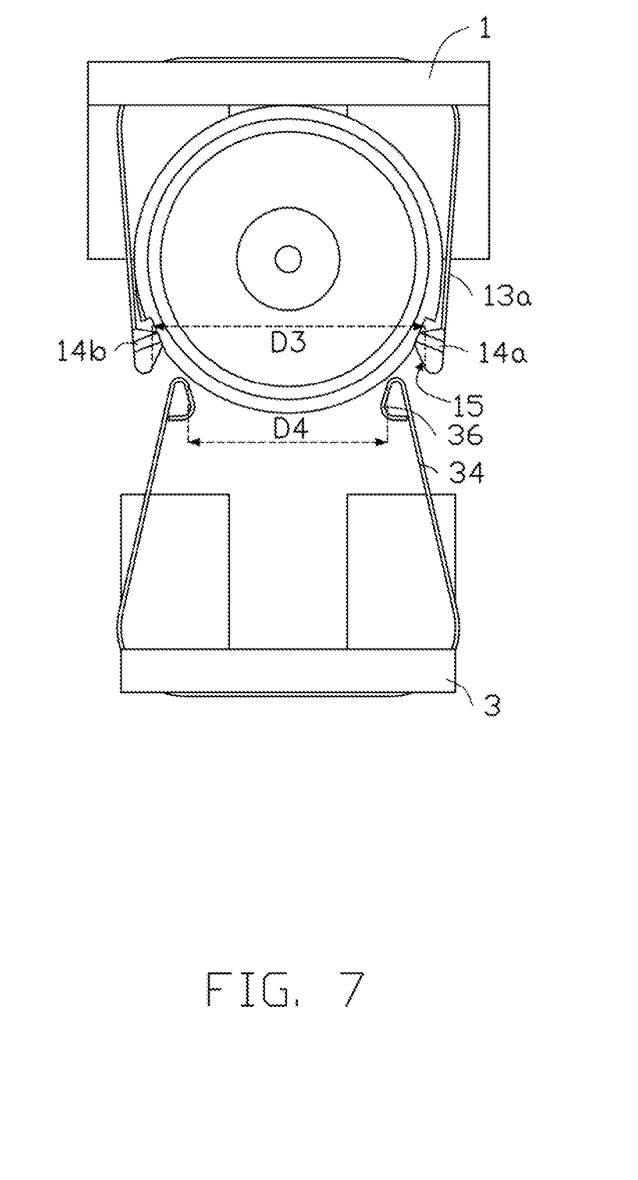
FIG. 7 is a diagram illustrating the printing base grasping the tube from the holder.
Figure 8:
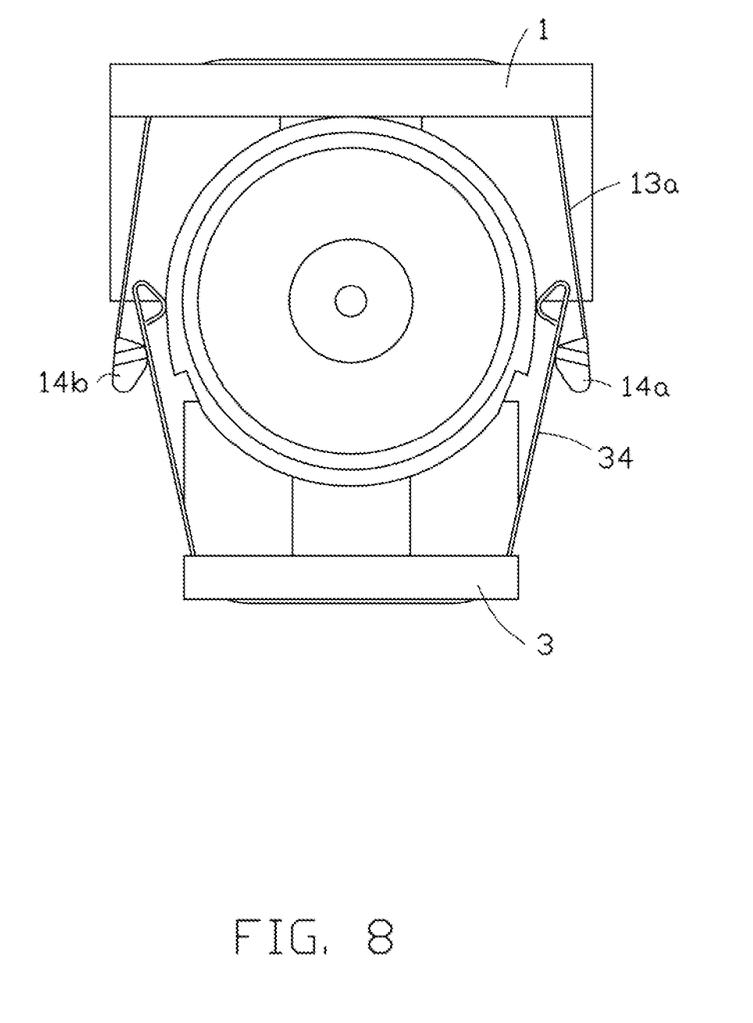
FIG. 8 is a diagram illustrating the tube grasped by the printing base from the holder of FIG. 7.

Referring to FIGS. 7-8, each of the hooking parts 14a and 14b comprises a first diagonal surface 15, and the sub clamping part 34 comprises two second diagonal surfaces 36, which are set in the two front ends of the sub clamping part 34. Then, the sub clamping part 34 can be jacked up or forced open by the clamping part 13a, or the clamping part 13a can be jacked up by the sub clamping part 34.

When the tube 2a is fixed on the holder 1, a third distance D3 between the two front ends of the clamping part 13a is greater than a fourth distance D4 between the two front ends of the sub clamping part 34. When the printing base 3 needs to grasp the tube 2a from the holder 1, the driver 4 drives the printing base 3 to move toward the holder 1, and the sub clamping part 34 jacks up the clamping part 13a to grasp the tube 2a.

After the printing base 3 moves a predetermined distance toward the holder 1, the sub clamping part 34 successfully grasps the tube 2a. Then, the driver 4 drives the printing base 3 to move away from the holder 1 to take the clamping part 13a and sub clamping part 34 out of contact. The printing base 3 can use the tube 2a to print.

Figure 9:
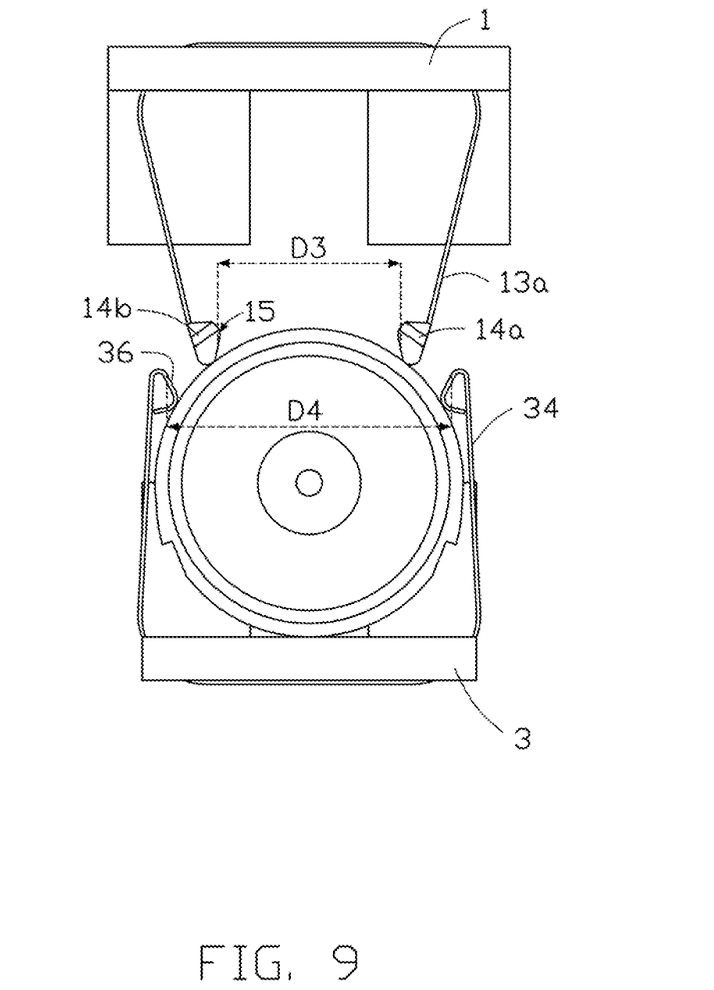
FIG. 9 is a diagram illustrating the replacement of the tube to the holder by the printing base.
Figure 10:
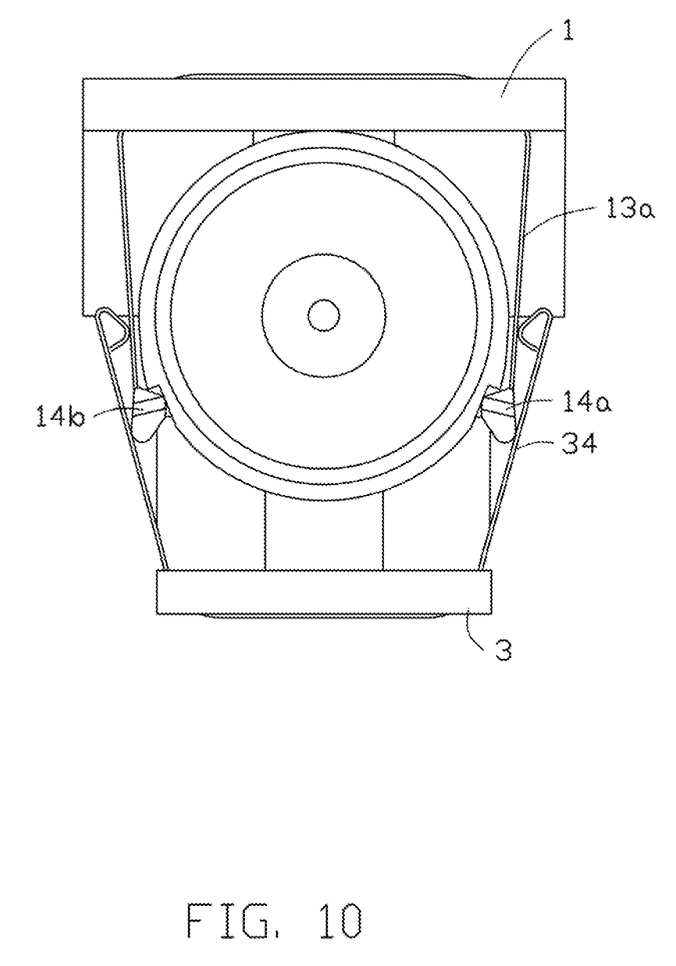
FIG. 10 is a diagram illustrating the tube replaced in the holder by the printing base.

Referring to FIGS. 9-10, when the tube 2a is fixed on the printing base 3, a third distance D3 between the two front ends of the clamping part 13a is less than a fourth distance D4 between the two front ends of the sub clamping part 34. When the printing base 3 needs to place the tube 2a back into the holder 1, the driver 4 drives the printing base 3 to move toward the holder 1, and the clamping part 13a jacks up the sub clamping part 34 to grasp the tube 2a.

After the printing base 3 moves a predetermined distance toward the holder 1, the two hooking parts 14a and 14b respectively slide to the two locking surfaces 22a and 22b of the tube 2a, and the clamping part 13a successfully grasps the tube 2a. Then, the driver 4 drives the printing base 3 to move away from the holder 1 to take the first clamping part 13a and sub clamping part 34 out of contact. The tube 2a is placed to the holder 1.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A tube exchanging device of a three dimensional (3D) printer, the tube exchanging device comprising:
   a plurality of tubes;
   a holder comprising a first side wall and a first bottom wall, a plurality of first clamping parts installed on the first side wall; and
   a printing base comprising a second clamping part;
   wherein each of the plurality of first clamping parts is configured to fix one of the plurality of tubes on the holder, each of the plurality of first clamping parts comprises two hooking parts, which are set in two front ends of the first clamping part; each tube comprises a guiding surface and two locking surfaces; when the two hooking parts slide from the guiding surface to the two locking surfaces, the two hooking parts are limited by the two locking surfaces to fix the tube on the holder; and the printing base grasps each of the plurality of tubes from the holder through the second clamping part.

2. The tube exchanging device of claim 1, wherein the printing base further comprises a second side wall and a second bottom wall; and the second clamping part is installed on the second side wall.

3. The tube exchanging device of claim 2, wherein the first clamping part and the second clamping part are leaf springs.

4. The tube exchanging device of claim 2, wherein each hooking part comprises a first diagonal surface; and the second clamping part comprises two second diagonal surfaces, which are set in two front ends of the second clamping part.

5. The tube exchanging device of claim 4, wherein when one of the plurality of tubes is fixed on the holder by the first clamping part, a first distance between the two front ends of the first clamping part is greater than a second distance between the two front ends of the second clamping part; when the printing base grasps the one of the plurality of tubes from the holder through the second clamping part, the printing base moves toward the holder, and the second clamping part jacks up the first clamping part to grasp the one of the plurality of tubes.

6. The tube exchanging device of claim 5, wherein when the printing base moves a predetermined distance toward the holder, the printing base switches to move away from the holder to take the first clamping part and second clamping part out of contact.

7. The tube exchanging device of claim 4, wherein when one of the plurality of tubes is fixed on the printing base by the second clamping part, a first distance between the two front ends of the first clamping part is less than a second distance between the two front ends of the second clamping part; when the printing base replaces the one of the plurality of tubes to the holder through the second clamping part, the printing base moves toward the holder, and the first clamping part jacks up the second clamping part to grasp the one of the plurality of tubes.

8. The tube exchanging device of claim 7, wherein when two hooking parts of the first clamping part respectively slide to two locking surfaces of the one of the plurality of tubes, the printing base switches to move away from the holder to take the first clamping part and second clamping part out of contact.

9. The tube exchanging device of claim 1, wherein the locking surface comprises a clamping surface and a limiting surface; the limiting surface is located between the guiding surface and the clamping surface; and the hooking part slides from the guiding surface to the clamping surface to be limited by the limiting surface.

10. A tube exchanging device of a 3D printer, the tube exchanging device comprising:
a holder comprising a first side wall and a first bottom wall, and a plurality of first clamping parts installed on the first side wall;
a plurality of tubes fixed on the holder through the plurality of first clamping parts;
a printing base comprising a second side wall and a second bottom wall, and a second clamping part installed on the second side wall; and
a driver;
wherein each of the plurality of first clamping parts comprises two hooking parts, which are set in two front ends of the first clamping part; each of the plurality of tubes comprises a guiding surface and two locking surfaces; the two hooking parts are limited by the two locking surfaces to fix one of the plurality of tubes on the holder; and
the driver drives the printing base to grasp each of the plurality of tubes from the holder through the second clamping part.

11. The tube exchanging device of claim 10, wherein the first clamping part and the second clamping part are leaf springs.

12. The tube exchanging device of claim 10, wherein each hooking part comprises a first diagonal surface; and the second clamping part comprises two second diagonal surfaces, which are set in two front ends of the second clamping part.

13. The tube exchanging device of claim 12, wherein when one of the plurality of tubes is fixed on the holder by the first clamping part, a first distance between the two front ends of the first clamping part is greater than a second distance between the two front ends of the second clamping part; when the printing base grasps the one of the plurality of tubes from the holder through the second clamping part, the driver drives the printing base to move toward the holder, and the second clamping part jacks up the first clamping part to grasp the one of the plurality of tubes.

14. The tube exchanging device of claim 13, when the printing base moves a predetermined distance toward the holder, the driver drives the printing base to move away from the holder to take the first clamping part and second clamping part out of contact.

15. The tube exchanging device of claim 12, wherein when one of the plurality of tubes is fixed on the printing base by the second clamping part, a first distance between the two front ends of the first clamping part is less than a second distance between the two front ends of the second clamping part; when the printing base replaces the one of the plurality of tubes to the holder through the second clamping part, the driver drives the printing base to move toward the holder, and the first clamping part jacks up the second clamping part to grasp the one of the plurality of tubes.

16. The tube exchanging device of claim 15, wherein when two hooking parts of the first clamping part slide to two locking surfaces of the one of the plurality of tubes, the driver drives the printing base to move away from the holder to take the first clamping part and second clamping part out of contact.

17. The tube exchanging device of claim 10, wherein the locking surface comprises a clamping surface and a limiting surface; the limiting surface is located between the guiding surface and the clamping surface; and the hooking part slides from the guiding surface to the clamping surface to be limited by the limiting surface.

* * * * *